(12) United States Patent
Jang et al.

(10) Patent No.: US 12,020,406 B2
(45) Date of Patent: Jun. 25, 2024

(54) IMAGE SIGNAL PROCESSING METHOD, IMAGE SENSING DEVICE INCLUDING AN IMAGE SIGNAL PROCESSOR

(71) Applicant: SAMSUNG ELECTRONICS CO., LTD., Suwon-si (KR)

(72) Inventors: Chan Young Jang, Pohang-si (KR); Gyeong Sung You, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 380 days.

(21) Appl. No.: 17/545,413

(22) Filed: Dec. 8, 2021

(65) Prior Publication Data

US 2022/0277423 A1 Sep. 1, 2022

(30) Foreign Application Priority Data

Feb. 26, 2021 (KR) ......................... 10-2021-0026096

(51) Int. Cl.
  *G06V 10/00* (2022.01)
  *G06T 5/70* (2024.01)
(52) U.S. Cl.
  CPC ..................................... *G06T 5/70* (2024.01)
(58) Field of Classification Search
  CPC .... G06T 5/73; G06T 5/70; G06T 5/10; G06T 5/002; G06T 2207/10024; G06T 2207/20192; H04N 25/60; H04N 25/46; H04N 25/772; H04N 25/75; H04N 23/80
  See application file for complete search history.

(56) References Cited

U.S. PATENT DOCUMENTS

| | | | | |
|---|---|---|---|---|
| 4,717,959 A | * | 1/1988 | Isago | H04N 23/673 348/351 |
| 4,816,663 A | * | 3/1989 | Utagawa | G02B 7/346 250/201.2 |
| 4,922,346 A | * | 5/1990 | Hidaka | H04N 23/673 348/355 |
| 5,322,998 A | * | 6/1994 | Jackson | G02B 27/46 359/709 |
| 5,684,293 A | * | 11/1997 | Kessler | H01L 31/02325 257/E27.15 |
| 7,880,804 B2 | * | 2/2011 | Hatano | G03B 17/00 348/354 |
| 8,735,207 B2 | | 5/2014 | Wang et al. | |
| 8,817,120 B2 | | 8/2014 | Silverstein et al. | |
| 9,118,828 B2 | * | 8/2015 | Okazawa | H04N 23/673 |
| 9,191,598 B2 | | 11/2015 | Blanquart et al. | |

(Continued)

FOREIGN PATENT DOCUMENTS

| | | |
|---|---|---|
| JP | 2004-248006 | 9/2004 |
| JP | 2007-116292 | 5/2007 |

(Continued)

*Primary Examiner* — Amir Alavi
(74) *Attorney, Agent, or Firm* — F. Chau & Associates, LLC (57) ABSTRACT

An image signal processing method includes: detecting a high frequency component in an input image received from an image sensor; calculating a ratio of the detected high frequency component; reconstructing a high frequency image based on the calculated ratio; and outputting an output image by combining the reconstructed high frequency image with a non-high frequency image of the input image.

20 Claims, 8 Drawing Sheets

(56) References Cited

U.S. PATENT DOCUMENTS

| | | | |
|---|---|---|---|
| 9,681,077 B2* | 6/2017 | Tubert | H04N 25/71 |
| 10,225,495 B2 | 3/2019 | Lee et al. | |
| 10,764,468 B2 | 9/2020 | Kimura | |
| 11,245,865 B2* | 2/2022 | Huang | H01L 27/14612 |
| 11,569,283 B2* | 1/2023 | Yamashita | H01L 27/14609 |
| 2007/0286588 A1* | 12/2007 | Hatano | G03B 17/00 |
| | | | 396/88 |
| 2013/0335601 A1 | 12/2013 | Shiota et al. | |
| 2022/0277423 A1* | 9/2022 | Jang | H04N 23/80 |

FOREIGN PATENT DOCUMENTS

| | | |
|---|---|---|
| JP | 2010-130446 | 6/2010 |
| KR | 1902869 | 10/2018 |

\* cited by examiner

IMAGE SIGNAL PROCESSING METHOD, IMAGE SENSING DEVICE INCLUDING AN IMAGE SIGNAL PROCESSOR

CROSS-REFERENCE TO RELATED APPLICATION

This application claims priority under 35 U.S.C. § 119 to Korean Patent Application No. 10-2021-0026096 filed on Feb. 26, 2021 in the Korean Intellectual Property Office, the disclosure of which is incorporated by reference herein in its entirety.

TECHNICAL FIELD

The present inventive concept relates to an image signal processing method and an image sensing device, and more particularly to an image signal processing, method and an image sensing device including an image signal processor.

DISCUSSION OF THE RELATED ART

An image sensing device may be used in a mobile device such as a smartphone, a tablet, a digital camera or the like, or various electronic devices. The image sensing device is typically configured in such a manner that pixels are two-dimensionally arranged, and the image sensing device outputs an electrical signal corresponding to brightness of incident light as a digital signal. Here, the image sensing device typically includes an analog-digital converter for converting an analog signal corresponding to brightness of incident light to a digital signal.

An image sensor is typically a charge coupled device (CCD) or a complementary metal-oxide semiconductor image sensor (CMOS). The CCD image sensor has less noise and an excellent image quality compared to the CMOS image sensor. The CMOS image sensor is relatively easy to operate and may be implemented by various scanning methods. Further, in the CMOS image sensor, it is relatively easy to miniaturize a product b integrating signal processing circuits on a single chip, and accordingly, a manufacturing cost may be reduced by using CMOS processing technology in a compatible manner. The CMOS image sensor may be easily applied to a mobile device due to its low power consumption.

The CMOS image sensor typically includes an analog-digital convener for converting an image signal detected as an analog signal to a digital signal. The pixel array of the image sensor includes a plurality of pixels arranged in the form of a two-dimensional matrix, and each of the pixels outputs an image signal from light energy of incident light. Each of the pixels integrates photocharges corresponding to the amount of light incident through a photodiode and outputs a pixel signal in the form of an analog current based on the integrated photocharges.

The CMOS image sensor may display the image signal superimposed with the characteristics of an active element, e.g., variation in a threshold value or the like. Since such characteristic variation has a fixed value for each pixel, fixed pattern noise may be generated in the image displayed on a screen.

SUMMARY

According to an exemplary embodiment of the present inventive concept, an image signal processing method includes: detecting a high frequency component in an input image received from an image sensor; calculating a ratio of the detected high frequency component; reconstructing a high frequency image based on the calculated ratio; and outputting an output image by combining the reconstructed high frequency image with a non-high frequency image of the input image.

According to an exemplary embodiment of the present inventive concept, an image sensing device includes: an image sensor configured to generate an input image; and an image signal processor configured to reconstruct a high frequency image from the input image and configured to generate an output image, wherein the output image is an image generated by combining the reconstructed high frequency image with a non-high frequency image of the input image.

According to an exemplary embodiment of the present inventive concept, an image signal processor includes: a high frequency (HF) component detector configured to detect a high frequency component and a non-high frequency component in an input image; an HF ratio calculator configured to calculate a ratio of the high frequency component to a binning image; and an HF image reconstructor configured to reconstruct a high frequency image based on the ratio, and to output an output image by combining the reconstructed high frequency image with a non-high frequency image of the input image.

BRIEF DESCRIPTION OF THE DRAWINGS

The above and other features of the present inventive concept will become more apparent by describing in detail exemplary embodiments thereof, with reference to the attached drawings, in which.

DETAILED DESCRIPTION OF THE EMBODIMENTS

Hereinafter, exemplary embodiments of the present inventive concept will be described with reference to the accompanying drawings.

The terms such as "unit", "module" and the like used in the detailed description and the functional blocks illustrated in the drawings may be implemented as hardware (e.g., circuits), software, or a combination thereof that is configured to perform a particular function.

Figure 1:
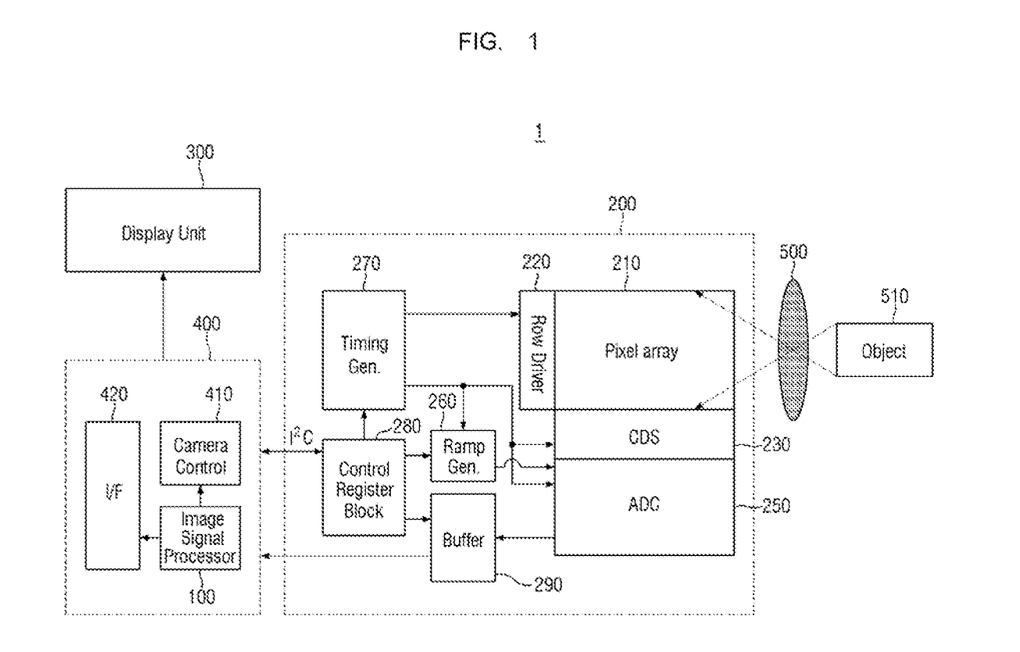
FIG. 1 illustrates an image sensing device according to an exemplary embodiment of the present inventive concept.

FIG. 1 illustrates an image sensing device according to an exemplary embodiment of the present inventive concept.

Referring to FIG. 1, in an exemplary embodiment of the present inventive concept, an image sensing device 1 may be implemented as a portable electronic device, e.g., a digital camera, a video camera, a mobile phone, a smart phone, a tablet personal computer (PC), a personal digital assistant (PDA), a mobile interact device (MID), a wearable computer, an Internet of Things (IoT) device, or an Internet of Everything (IoE) device.

In an exemplary embodiment of the present inventive concept, the image sensing device 1 may include a display unit 300, a digital signal processor (DSP) 400, and an image sensor 200. The image sensor 200 may be, e.g., a CMOS image sensor.

The image sensor 200 includes a pixel array 210, a row driver 220, a correlated double sampling (CDS) block 230, and an analog-digital convener (ADC) 250, a ramp generator 260, a timing generator 270, a control register block 280, and a buffer 290.

The image sensor 200 may sense an object 510 whose image is captured through a lens 500 controlled by the DSP 400, and the DSP 400 may output the image sensed by the image sensor 200 to a display unit 300.

In an exemplary embodiment of the present inventive concept, the image sensor 200 may receive a raw image from the pixel array 210, and perform analog binning thereon through the ADC block 250 and the buffer 290. The image sensor 200 may output the binning image to the display unit 300.

The display unit 300 includes any device capable of outputting or displaying an image. For example, the display unit 300 may be a computer, a mobile communication device, or another type of image output terminal or device.

The DSP 400 includes a camera control 410, an image signal processor (ISP) 100, and an interface (I/F) 420.

The camera control 410 controls the operation of the control register block 280. The camera control 410 may control the operation of the image sensor 200, e.g., the control register block 280, using an inter-integrated circuit (I²C), but the present inventive concept is not limited thereto.

The ISP 100 receives image data outputted from the buffer 290, and processes the received image data to be visible to human eyes. In addition, the ISP 100 outputs the processed image data to the display unit 300 through the I/F 420.

In an exemplary embodiment of the present inventive concept, the ISP 100 may process the image data outputted from the image sensor 200. The ISP 100 may output the digital binning image as a final binning image to the display unit 300. For example, the image outputted from the image sensor 200 may be a raw image from a pixel array in an exemplary embodiment of the present inventive concept, or may be a binning image in an exemplary embodiment of the present inventive concept. Although various embodiments may be implemented, in this specification, it is expressed that the image data is outputted from the image sensor 200 for simplicity of description.

Although it is illustrated in the embodiment of FIG. 1 that the ISP 100 is disposed inside the DSP 400, the ISP 100 may be disposed inside the image sensor 200 in an exemplary embodiment of the present inventive concept. In an exemplary embodiment of the present inventive concept, the image sensor 200 and ISP 100 may be implemented as one package, e.g., a multi-chip package (MCP). In an exemplary embodiment of the present inventive concept, the ISP 100 may be separate from the DSP 400 and the image sensor 200.

The pixel array 210 includes a plurality of pixels arranged in a matrix form. For example, each of the plurality of pixels includes a photodetector (or, e.g., photoelectric conversion element) and a lead-out circuit for outputting a pixel signal, e.g., an analog signal, corresponding to charges generated by the photodetector based on incident light. The photodetector may be implemented as, e.g., a photo diode or a pinned photo diode.

The row driver 220 may activate each of the plurality of pixels. For example, the row driver 220 may drive the pixels of the pixel array 210 in units of rows. For example, the row driver 220 may generate control signals capable of controlling the operations of the plurality of pixels included in each of the plurality of rows.

The pixel signal outputted from each of the plurality of pixels is transmitted to the CDS block 230 in response to the control signals.

The CDS block 230 includes a plurality of CDS circuits. Each of the plurality of CDS circuits may perform correlated double sampling on pixel values outputted from each of a plurality of column lines of the pixel array 210 in response to at least one switch signal outputted from the timing generator 270, and compare the pixel values subjected to the correlated double sampling with the lamp signal outputted from the lamp signal generator 260. In addition, each of the plurality of CDS circuits may output a plurality of comparison signals.

The ADC block 250 may convert the plurality of outputted comparison signals into a plurality of digital signals and output the plurality of digital signals to the buffer 290.

The lamp signal generator 260 outputs a ramp signal to the CDS block 230. The ramp signal ramps from a reference level to be compared with a reset signal, and rises to the reference level. In addition, the ramp signal ramps again from the reference level to be compared with an image signal.

The timing generator 270 may control the operations of the row driver 220, the ADC block 250, the CDS block 230, and the ramp signal generator 260 that is under the control of the control register block 280.

The control register block 280 controls the operations of the timing generator 270, the ramp signal generator 260, and the buffer 290 that is under the control of the DSP 400.

The buffer 290 may transmit image data corresponding to a plurality of digital signals (e.g., converted comparison signals), which are outputted from the ADC block 250, to the DSP 400.

The raw image data outputted from the pixel array 210 through the CDS block 230 and the ADC block 250 may be Bayer image data having a Bayer format. In an exemplary embodiment of the present inventive concept, the ISP 100 may receive the Bayer image data as an input image from the image sensor 200, and may process the input image. In addition, the ISP 100 may output an output image. The output image is displayed on the display unit 300.

The raw image data may be displayed while being superimposed with the fixed pattern noise caused by the characteristics of the active element of the image sensor 200. For example, the pixel arrays include, especially for resolution, a Tetra structure, a Nona structure, or the like. In the pixel arrays including such structures, crosstalk may occur due to the short distance between adjacent pixels, so that the raw image data may become an abnormal image due to the fixed pattern noise or the like.

In the raw image data containing the fixed pattern noise, calibration may be applied to a planar light image of a specific color temperature, but this may affect an image of another color temperature.

Therefore, the ISP 100 may process the input image containing the fixed pattern noise and output the output image from which the fixed pattern is removed to the display unit 300. For example, the ISP 100 may generate the output image by reconstructing (or, e.g., constructing) a high frequency image from the input image and combining the reconstructed high frequency image with a non-high frequency component. Since the output image is generated by adjusting the predetermined range for reconstructing the high frequency image, it is possible to perform tuning suitable for the characteristics of the image sensing device 1, and it is also possible to effectively remove the fixed pattern noise without calibration using other hardware components. The operation of the ISP 100 will be described in detail later.

Figure 2:
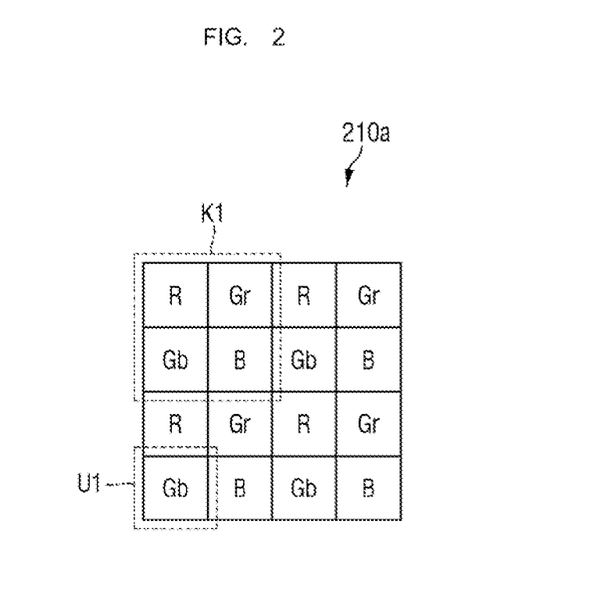
FIGS. 2, 3 and 4 are diagrams illustrating a pixel array according to an exemplary embodiment of the present inventive concept.
Figure 3:
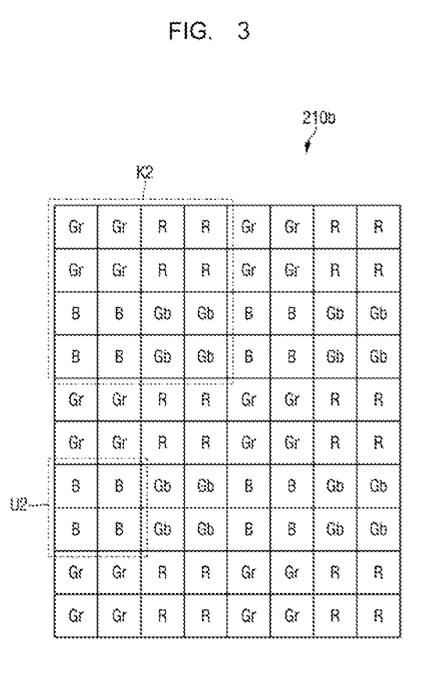
Figure 4:
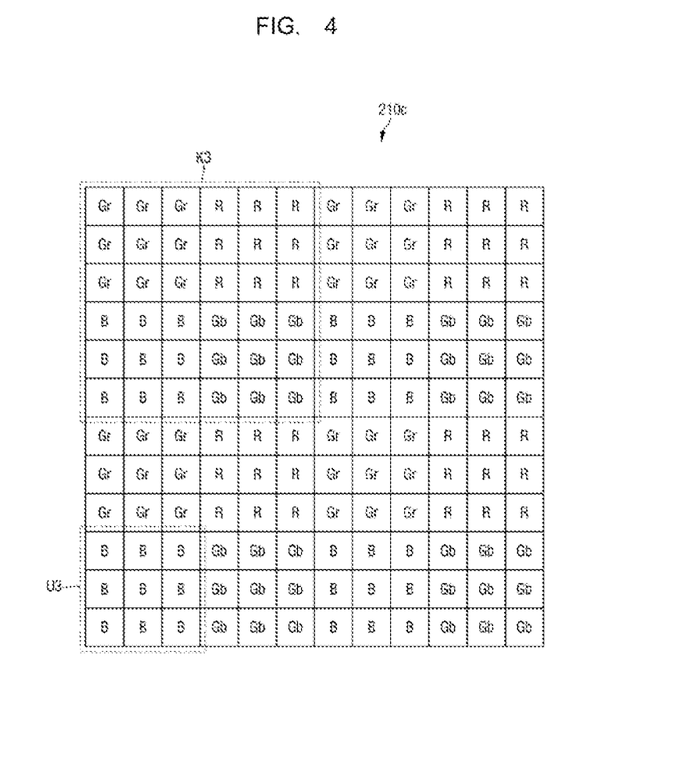

FIGS. 2 to 4 are diagrams illustrating a pixel array according to an exemplary embodiment of the present inventive concept.

The pixel array 210 may be arranged in a Bayer pattern in an exemplary embodiment of the present inventive concept. The Bayer pattern includes a row in which R (red) pixels and Gr (green) pixels are repeatedly arranged and a row in which Gb (green) pixels and B (blue) pixels are repeatedly arranged.

The raw image may operate in a kernel unit (K1). In an exemplary embodiment of the present in concept, the kernel unit (K1) may include at least one R (red) pixel, at least one Gr (green) pixel, at least one Gb (green) pixel, and at least one B (blue) pixel. Although it is referred to as a kernel in this specification, it may also be referred to as a window, a unit, or the like depending on various embodiments.

Referring to FIG. 2, the Bayer pattern may include one R (red) pixel, one B (blue) pixel, and two G (green, Gr, Gb) pixels in one unit pixel group. For example, color pixels U1 of the respective colors may be contained and arranged in the Bayer pattern. Accordingly, the raw image has the Bayer pattern in which the row, in which the Gr pixel and the R pixel are sequentially arranged, and the row, in which the B pixel and the Gb pixel are sequentially arranged, are alternately arranged.

In an exemplary embodiment of the present inventive concept, in a pixel array 210a shown in FIG. 2, the kernel K1 has a 2×2 size. However, the present inventive concept may be applied to kernels of various sizes, e.g., 3×3, 2×4, 5×5, and the like.

In addition, the Bayer pattern may include a plurality of R (red) pixels, a plurality of B (blue) pixels, and a plurality of G (green, Gr, Gb) pixels in one unit pixel group. For example, the color pixels of the respective colors may be arranged in a 2×2 array, a 3×3 array, or the like.

Referring to FIG. 3, in one example, a unit kernel K2 in a pixel array 210b of a raw image may be a Bayer pattern in which color pixels of the Tetra structure are arranged. For example, various color pixels U2 may include R pixels in a 2×2 array, Gr pixels in a 2×2 array, Gb pixels in a 2×2 array, and B pixels in a 2×2 array.

In addition, referring to FIG. 4, in one example, a unit kernel K3 in a pixel array 210c of a raw image may be a Bayer pattern in which color pixels of the Nona structure are arranged. For example, various color pixels U3 may include R pixels in a 3×3 array, Gr pixels in a 3×3 array, Gb pixels in a 3×3 array, and B pixels in a 3×3 array.

Further, depending on various embodiments, the unit kernel may have a structure in which color pixels in an N×N array (N being a natural number greater than or equal to 2) are arranged in the Bayer pattern.

Figure 5:
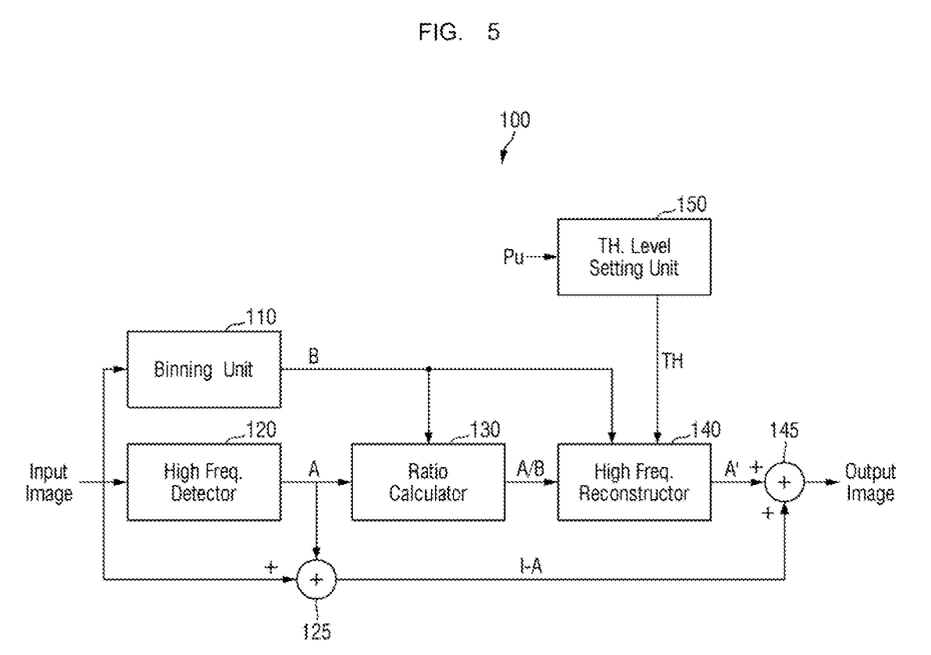
FIG. 5 is a block diagram illustrating an image signal processor according to an exemplary embodiment of the present inventive concept.
Figure 6:
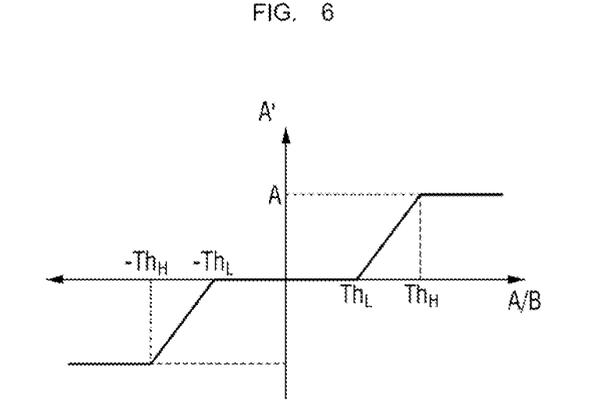
FIG. 6 is a graph illustrating setting of a threshold level.
Figure 7:
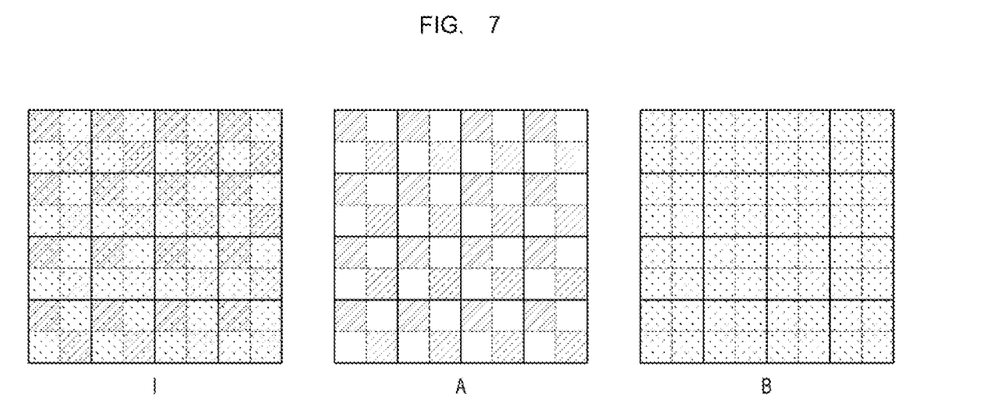
FIGS. 7, 8 and 9 are images illustrating the operation of the image signal processor.
Figure 8:
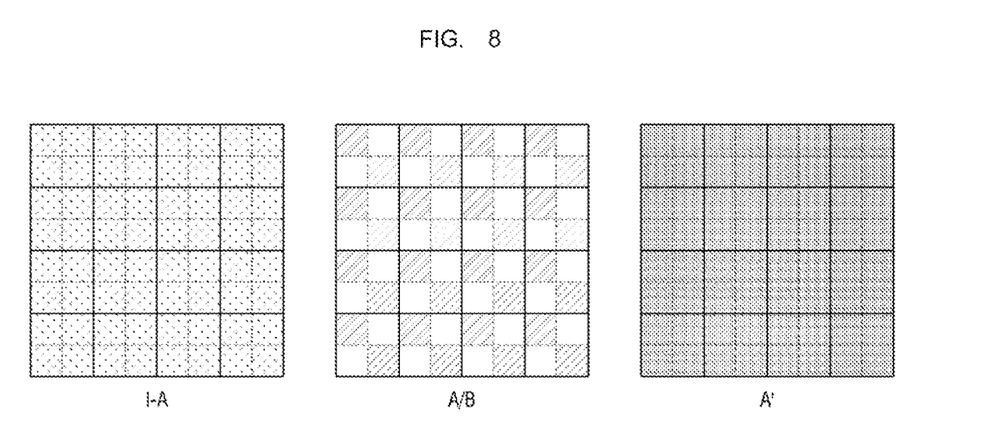
Figure 9:
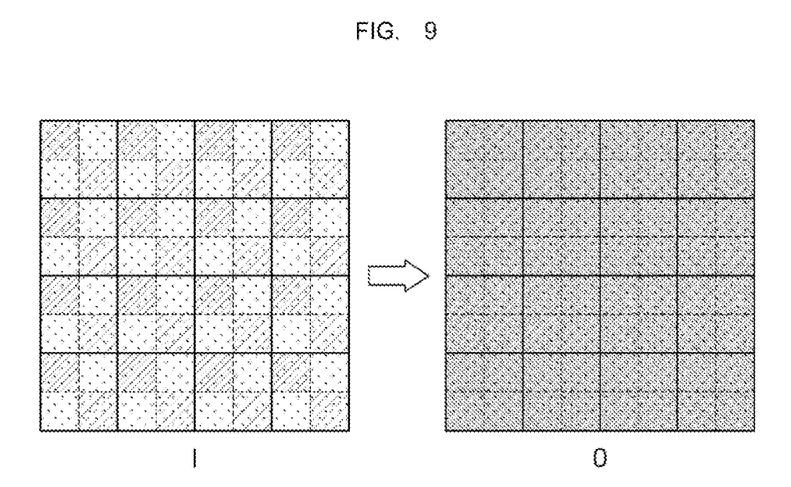

FIG. 5 is a block diagram illustrating an image signal processor according to an exemplary embodiment of the present inventive concept. FIG. 6 is a graph illustrating setting of a threshold level. FIGS. 7 to 9 are images illustrating the operation of the image signal processor.

Referring to FIGS. 5 to 9, the ISP 100 may include a binning unit 110, a high frequency (HF) component detector 120, an HF ratio calculator 130, an HF image reconstructor 140, and a threshold level setting unit 150.

The ISP 100 receives an input image I from the image sensor 200. The input image I may be a raw image of the Bayer pattern superimposed with fixed pattern noise, as in the example illustrated in FIG. 7.

The binning unit 110 performs binning of the input image and outputs a binning image B. The binning unit 110 outputs the binning image B to the HF ratio calculator 130 and the HF image reconstructor 140.

In an exemplary embodiment of the present inventive concept, the binning image B may be an image generated by adding up or passing raw pixel signals of the input image. In an exemplary embodiment of the present inventive concept, the binning image B may also be an image generated by outputting the raw pixel signals of the input image I for each kernel or by calculating the average value of the plurality of kernels. In the case of performing image processing on the raw image itself, a large amount of data may be used and power consumption may increase. Therefore, it is possible to reduce the size of the image data to be processed later by performing binning for generating one pixel data using data of adjacent pixels. In the example shown in FIG. 7, when the binning of the input image I is performed, the binning image B may be displayed as an image from which a part of the noise is removed by adding up, passing, or averaging noise components.

The HF component detector 120 detects a high frequency component A in the input image I. The high frequency component may be an image of a frequency component exceeding a preset critical frequency. The high frequency component may include, e.g., at least one of a horizontal high frequency component, a vertical high frequency component, or a diagonal high frequency component. In one example, the high frequency component A may be displayed as a fixed pattern due to the characteristic variation caused by the structure of the pixel array 210, as shown in FIG. 7.

The ISP 100 may further include a first calculation unit 125 for generating a non-high frequency component as remaining frequency components in the input image I that do not include the high frequency component A. The first calculation unit 125 may be configured as an independent module (or, e.g., circuit) or may be included in the HF component detector 120 depending on various embodiments.

The HF ratio calculator 130 calculates the ratio of the high frequency component A in the entire image. For example, the HF ratio calculator 130 may calculate the ratio R of the high frequency component A to the binning image B.

For example, the ratio R may be obtained by Eq. (1).

$$R = \frac{A}{B} = \frac{|\text{High } Freq.\text{element}|}{\text{Binned Image}} \quad (1)$$

For example, a ratio image A/B shown in FIG. 8 may be the same or similar to the high frequency component A of FIG. 7.

The HF image reconstructor 140 may reconstruct a high frequency image A' by applying the ratio R to the binning image B. In addition, the applied ratio may be the ratio adjusted by the threshold level setting unit 150.

The threshold level setting unit 150 may adjust the ratio by determining whether or not the ratio R calculated by the HF ratio calculator 130 is within the predetermined range. The predetermined range may be the range of the ratio of the high frequency component set based on a user's input Pu. For example, a user may set the predetermined range in consideration of the characteristics of the image sensing device 1. The user's input may be, e.g., a lowest ratio $Th_L$ and a highest ratio $Th_H$ of the ratio R.

Referring to FIG. 6, when the ratio (R=A/B) calculated by the HF ratio calculator 130 is within the predetermined range (between the lowest ratio $Th_L$ and the highest ratio $Th_H$), the HF image reconstructor 140 may reconstruct the high frequency image A' by applying the calculated ratio to the binning image B. In addition, when the ratio (R=A/B) calculated by the HF ratio calculator 130 is not within the predetermined range, e.g., when the ratio is smaller than the lowest ratio $Th_L$, the HF image reconstructor 140 may reconstruct the high frequency image by adjusting the calculated ratio to a preset lowest threshold ratio and applying the lowest threshold ratio to the binning image B. In addition, when the ratio (R=A/B) calculated by the HF ratio calculator 130 is not within the predetermined range, e.g., when the ratio is greater than the highest ratio $Th_H$, the HF image reconstructor 140 may reconstruct the high frequency image A' by adjusting the calculated ratio to a preset highest threshold ratio and applying the highest threshold ratio to the binning image B.

In an exemplary embodiment of the present inventive concept, the HF image reconstructor 140 may reconstruct the high frequency image A' at a preset lowest threshold ratio when the ratio is smaller than the predetermined range, and may reconstruct the high frequency image A' at a preset highest threshold ratio when the ratio is greater than the predetermined range.

For example, in the case of comparing the high frequency component A of FIG. 7 with the reconstructed high frequency image A' of FIG. 8, the high frequency image is reconstructed based on the ratio adjusted based on the predetermined range, so that the frequency component corresponding to the fixed pattern noise is removed and the other high frequency components corresponding to the details of the input image (e.g., the portion corresponding to the edge of the input image) remain.

The reconstructed high frequency image A' may be combined with a non-high frequency component and generated as an output image O. The non-high frequency component may be an image I-A of the other frequency components, not including the high frequency component A, in the input image I. As shown in FIG. 9, the ISP 100 may output the output image O from which the fixed pattern noise is removed from the input image I by reconstructing the high frequency image based on the ratio adaptively adjusted to the characteristics of the image sensing device I.

The ISP 100 may further include a second calculation unit 145 for combining the reconstructed high frequency image A' with the non-high frequency component. The second calculation unit 145 may be included in the HF image reconstructor 140 or may be configured as a separate module depending on various embodiments.

Figure 10:
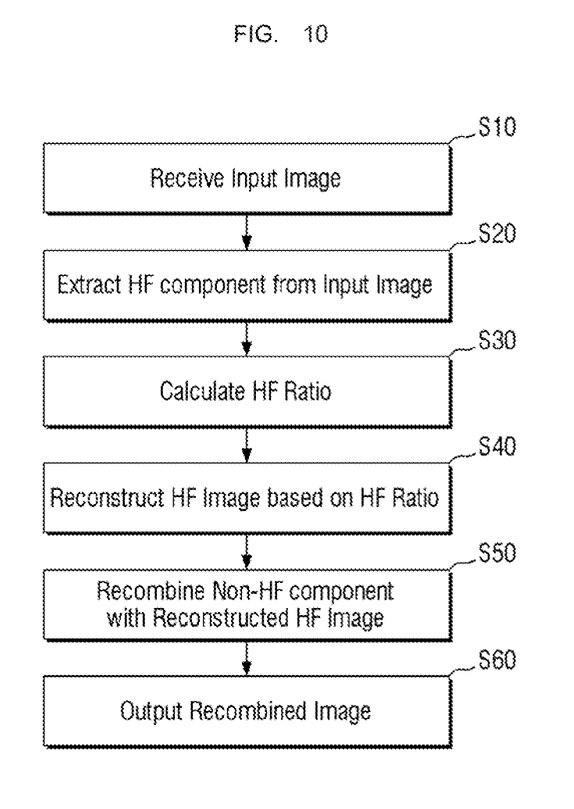
FIG. 10 is a flowchart illustrating an image signal processing method according to an exemplary embodiment of the present inventive concept.

FIG. 10 is a flowchart showing an image signal processing method according to an exemplary embodiment of the present inventive concept.

Referring to FIG. 10, the ISP of the image sensing device receives an input image from an image sensor (step S10). The input image, as raw image data, may be a Bayer pattern image.

The ISP may detect and extract a high frequency component from the input image (step S20). For example, the high frequency component may be filtered based on a preset critical frequency.

The ISP calculates a ratio of the high frequency component (step S30). For example, the ratio may be calculated as the ratio of the high frequency component to a binning image, which is obtained by binning the input image.

The ISP may reconstruct a high frequency image based on the ratio of the high frequency component (step S40). According to an exemplary embodiment of the present inventive concept, the ratio applied to reconstruct the high frequency image may be the ratio calculated in step S30 (i.e., the ratio of the high frequency component to a binning image), or may be an adjusted ratio. For example, when the calculated ratio is within the set predetermined range, the calculated ratio may be intactly applied to the binning image to reconstruct the high frequency image. In another example, when the calculated ratio is not within the set predetermined range, the adjusted ratio may be applied to the binning image to reconstruct the high frequency image. For example, the predetermined range may be a lowest ratio or a highest ratio set by a user depending on the characteristics of the image sensing, device 1. In an example, the predetermined range may be a lowest ratio or a highest ratio determined in consideration of at least one of a horizontal high frequency component, a vertical high frequency component, or a diagonal high frequency component.

The ISP may generate an output image by combining the non-high frequency component with the reconstructed high frequency image (step S50) and output the recombined image (step S60). The output recombined image may have an increased resolution because the high frequency image, in which the fixed pattern noise is removed and the details of the input image remain, is reconstructed based on the ratio adaptively adjusted to the characteristics of the image sensing device 1, and is then combined with the non-high frequency component.

By tuning the predetermined range based on the degree of the fixed pattern noise using the image signal processing method, it is possible to adaptively remove the fixed pattern noise while reducing the influence of external parameters such as a specific color temperature and the like.

Figure 11:
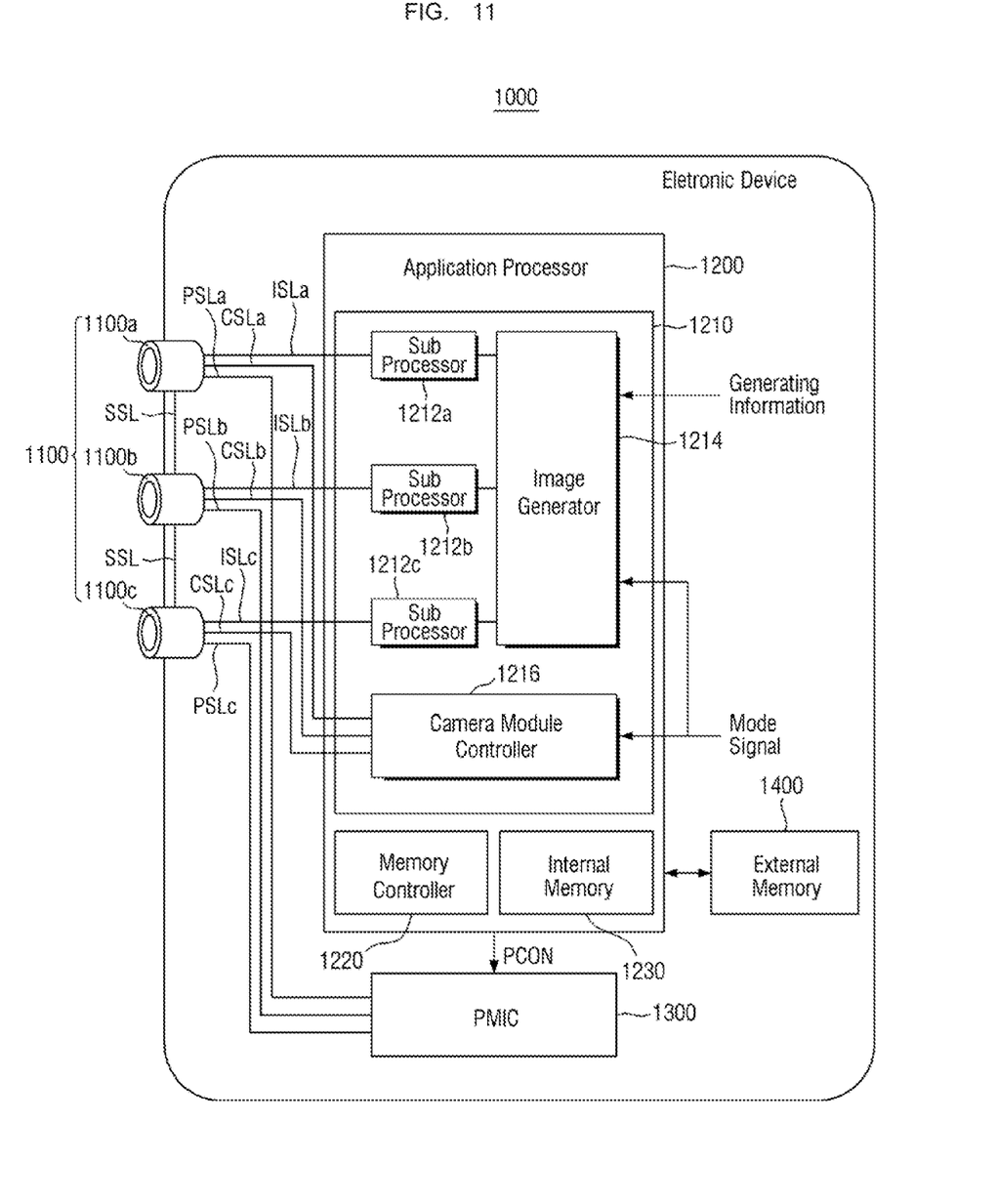
FIG. 11 is a block diagram of an electronic device including a multi-camera module according to an exemplary embodiment of the present inventive concept.
Figure 12:
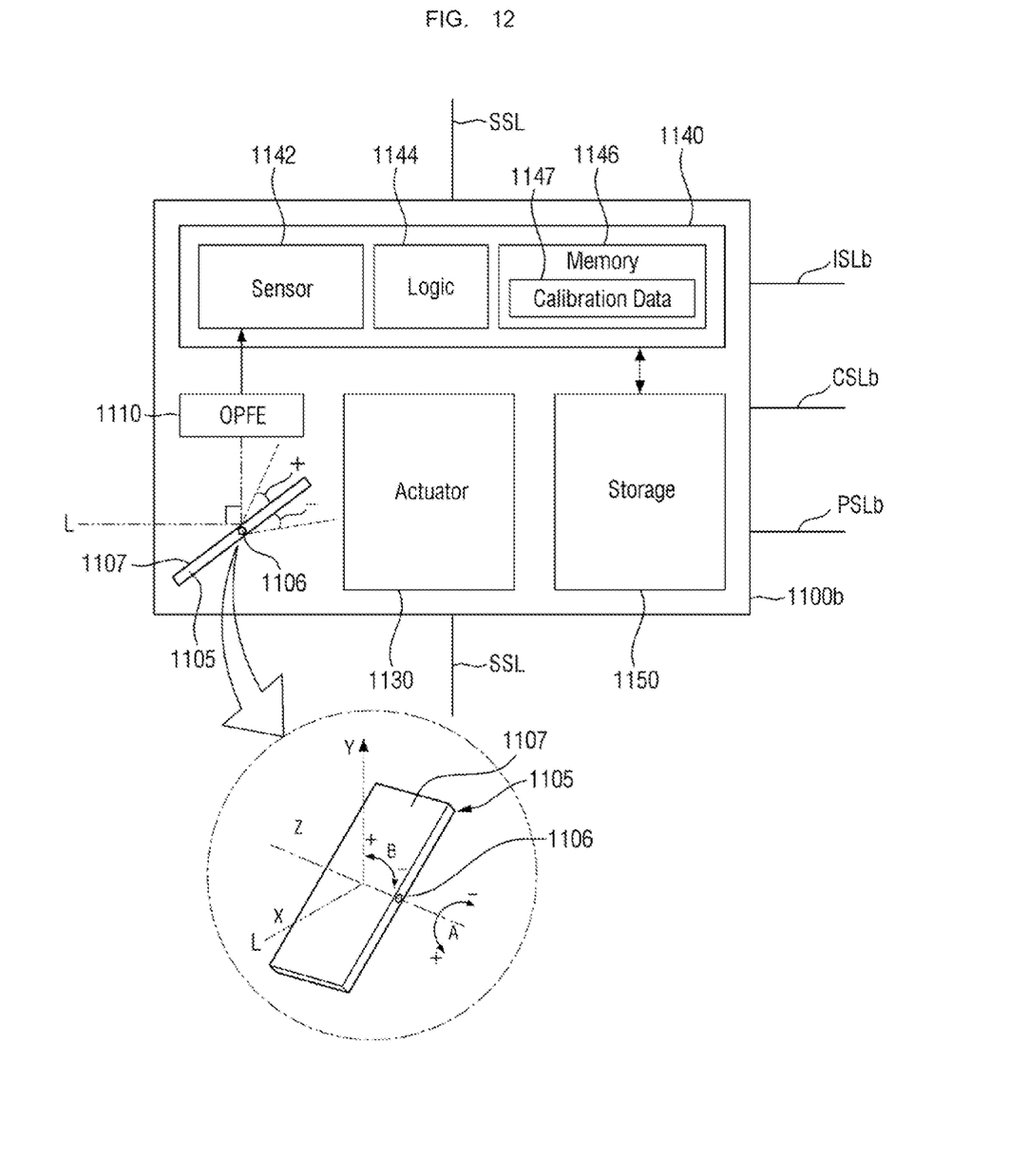
FIG. 12 is a detailed block diagram of the multi-camera module of FIG. 11.

FIG. 11 is a block diagram of an electronic device including a multi-camera module according to an exemplary embodiment of the present inventive concept. FIG. 12 is a detailed block diagram of the multi-camera module of FIG. 11.

Referring to FIG. 11, an electronic device 1000 may include a camera module group 1100, an application processor 1200, a power management integrated circuit (PMIC) 1300, and an external memory 1400.

The camera module group 1100 may include a plurality of camera modules 1100*a*, 1100*b*, and 1100*c*. FIG. 11 illustrates that the camera module group 1100 includes three camera modules, but the present inventive concept is not limited thereto. In addition, the camera module group 1100 may include only two camera modules. In addition, the camera module group 1100 may include n camera modules (where n is a natural number of 4 or greater).

The structure of the camera module 1100b will hereinafter be described with reference to FIG. 12. The description that follows may be directly applicable to the other camera modules of the camera module group 1100, e.g., the camera modules 1100a and 1100c.

Referring to FIG. 12, the camera module 1100b may include a prism 1105, an optical path folding element (OPFE) 1110, an actuator 1130, an image sensing apparatus 1140, and a storage unit 1150.

The prism 1105 may include a reflective surface 1107 including a light-reflecting, material, and may thus change the path of light L incident from the outside.

In an exemplary embodiment of the present inventive concept, the prism 1105 may change the path of light L that is incident in a first direction X to a second direction Y, which is perpendicular to the first direction X, by reflecting the incident light L. In addition, the prism 1105 may change the path of the light L incident in the first direction X to the second direction Y by rotating the prism 1105 in an "A" or B direction from a central axis 1106 of the reflective surface 1107. In this case, the OPFE 1110 may move in a third direction Z, which is perpendicular to the first and second directions X and Y.

In an exemplary embodiment of the present inventive concept, the maximum rotation angle of the prism 1105 may be about 15 degrees or less in a "plus A" direction and may be about 15 degrees or greater in a "minus A" direction, but the present inventive concept is not limited thereto.

In an exemplary embodiment of the present inventive concept, the prism 1105 may move, with respect to the second direction Y, at an angle of about 20°, about 10° to 20°, or about 15° to about 20° in a "plus B" or "minus B" direction. The angle by which the prism 1105 moves may be the same in both the "plus B" direction and the "minus B" direction or may be almost similar with a difference of about 1°.

In an exemplary embodiment of the present inventive concept, the prism 1105 may move in the third direction Z, which is parallel to the direction in which the central axis 1106 of the reflective surface 1107 extends.

The OPFE 1110 may include, for example, a group of in optical lenses (where m is a natural number). The in optical lenses may be moved in the second direction Y to change the optical zoom ratio of the camera module 1100b. For example, if the default optical zoom ratio of the camera module 1100b is Z, the optical zoom ratio of the camera module 1100b may be changed to 3Z or 5Z (or greater) by moving the in optical lenses of the OPFE 1110.

The actuator 1130 may move the OPFE 1110 or an optical lens to a particular location. For example, the actuator 1130 may adjust the location of the optical lens such that an image sensor 1142 may be located at the focal length of the optical lens for a precise sensing an image of an object.

The image sensing apparatus 1140 may include the image sensor 1142, a control logic 1144, and a memory 1146. The image sensor 1142 may sense an image of a target object using the light L provided thereto via the optical lens. The control logic 1144 may control the general operation of the camera module 1100b. For example, the control logic 1144 may control the operation of the camera module 1100b in accordance with control signals provided via a control signal line CSLb.

The memory 1146 may store information used for the operation of the camera module 1100b, such as calibration data 1147. The calibration data 1147 may include information for generating image data using the light L. The calibration data 1147 may include, for example, degree-of-rotation information, focal length information, and optical axis information. In a case where the camera module 1100b is implemented as a multi-state camera whose focal distance changes in accordance with the location of the optical lens, the calibration data 1147 may include, for example, focal distances for different locations (or different states) of the optical lens and autofocusing information.

The storage unit 1150 may store image data sensed by the image sensor 1142. For example, the storage unit 1150 may be disposed on the outside of the image sensing apparatus 1140 and may be implemented as being stacked on a sensor chip that forms the image sensing apparatus 1140; however, the present inventive concept is not limited thereto. In an exemplary embodiment of the present inventive concept, the storage unit 1150 may be implemented as an electrically erasable programmable read-only memory (EEPROM), but the present inventive concept is not limited thereto.

Referring to FIGS. 11 and 12, in an exemplary embodiment of the present inventive concept, each of the camera modules 1100a, 1100b, and 1100c may include their own actuators 1130. The camera modules 1100a, 1100b, and 1100c may include the same calibration data 1147 or different calibration data 1147 depending on the operation of their own actuators 1130.

In an exemplary embodiment of the present inventive concept, one of the camera modules 1100a, 1100b, and 1100c, for example, the camera module 1100b, may be a folded lens-type camera module including the prism 1105 and the OPFE 1110, and the other camera modules, i.e., the camera modules 1100a and 1100c, may be vertical camera modules not including the prism 1105 and the OPFE 1110. However, the present inventive concept is not limited to this.

In an exemplary embodiment of the present inventive concept, the camera module 1100c may be, for example, a depth camera capable of extracting depth information using infrared (IR) light. For example, the application processor 1200 may generate a three-dimensional (3D) depth image by merging image data provided by the camera module 1100c and image data provided by the other camera modules, i.e., the camera modules 1100a and 1100b.

In an exemplary embodiment of the present inventive concept, at least two of the camera modules 1100a, 1100b, and 1100c may have different fields of view. In this case, at least two of the camera modules 1100a, 1100b, and 1100c, for example, the camera modules 1100a and 1100b, may have different optical lenses, but the present inventive concept is not limited thereto.

In addition, in an exemplary embodiment of the present inventive concept, the camera modules 1100a, 1100b, and 1100c may have different fields of view. For example, the camera modules 1100a, 1100b, and 1100c may have different optical lenses, but the present inventive concept is not limited thereto.

In an exemplary embodiment of the present inventive concept, the camera modules 1100a, 1100b, and 1100c may be disposed to be physically separate from one another. For example, the camera modules 1100a, 1100b, and 1100c may not share the sensing area of a single image sensor 1142; instead, independent image sensors 1142 may be disposed in each of the camera modules 1100a, 1100b, and 1100c.

Referring again to FIG. 11, the application processor 1200 may include an image processor 1210, a memory controller 1220, and an internal memory 1230. The application processor 1200 may be implemented as being separate from the camera modules 1100a, 1100b, and 1100c. For example, the application processor 1200 may be implemented on a semiconductor chip separate from the semiconductor chip on which the camera modules 1100a, 1100b, and 1100c may be implemented.

The image processor 1210 may include a plurality of sub-image processors 1212a, 1212b, and 1212c, an image generator 1214, and a camera module controller 1216.

The image processor 1210 may include as many sub-image processors as there are camera modules, e.g., a plurality of sub-image processors 1212a, 1212b, and 1212c corresponding to the camera modules 1100a, 1100b, and 1100c, respectively.

Image data generated by the camera modules 1100a, 1100b, and 1100c may be respectively provided to the sub-image processors 1212a, 1212b, and 1212c via image signal lines ISLa, ISLb, and ISLb, which are separate from one another. For example, the image data generated by the camera module 1100a may be provided to the sub-image processor 1212a via the image signal line ISLa. In addition, the image data generated by the camera module 1100b may be provided to the sub-image processor 1212b via the image signal line ISLb, and the image data generated by the camera module 1100c may be provided to the sub-image processor 1212c via the image signal line ISLc. The transmission of the image data may be performed via, for example, a mobile industry processor interface (MIPI)—camera serial interface (CIS), but the present inventive concept is not limited thereto.

In an exemplary embodiment of the present inventive concept, a single sub-image processor may be disposed to correspond to a plurality of camera modules. For example, the sub-image processors 1212a and 1212c may be incorporated into a single integrated sub-Image processor, and the image data provided by the camera module 1100a or the image data provided by the camera module 1100c may be selected by a selection element (e.g. a multiplexer) and may then be provided to the integrated sub-image processor.

The image data provided to each of the sub-image processors 1212a, 1212b, and 1212c may be provided to the image generator 1214. The image generator 1214 may generate an output image using the image data provided thereto from each of the sub-image processors 1212a, 1212b, and 1212c, in accordance with image generating information, "generating information", or a mode signal, "Mode Signal".

For example, the image generator 1214 may generate an output image by merging at least some of the image data provided by the camera modules 1100a, 1100b and 1100c, which have different fields of view, in accordance with the image generating information "generating information" or the mode signal "Mode Signal". In addition, the image generator 1214 may generate an output image by selecting one of the image data generated by the camera modules 1100a, 1100b, and 1100c, which have different fields of view, in accordance with the image generating information "generating information" or the mode signal "Mode Signal".

In an exemplary embodiment of the present inventive concept, the image generating, information, "generating information", may include a zoom signal or a zoom factor. In an exemplary embodiment of the present inventive concept, the mode signal "Mode Signal", may be, for example, a signal based on a mode selected by a user.

In a case where the image generating information, "generating information", is a zoom signal or a zoom factor and the camera modules 1100a, 1100b, and 1100c have different fields of view, the image generator 1214 may perform different operations depending on the type of zoom signal. For example, if the zoom signal is a first signal, the image data provided by the camera module 1100a and the image data provided by the camera module 1100c may be merged together, and an output image may be generated using the merged image data and the image data provided by the camera module 1100b. In addition, if the zoom signal is a second signal, which is different from the first signal, one of the image data provided by the camera module 1100a, the image data provided by the camera module 1100b, and the image data provided by the camera module 1100c may be chosen, and an output image may be generated using the chosen image data. However, the present inventive concept is not limited to this example. The method to process image data may vary, as necessary.

In an exemplary embodiment of the present inventive concept, the image generator 1214 may receive a plurality of image data having different exposure times from at least one of the sub-image processors 1212a, 1212b, and 1212c and may perform high-dynamic range processing on the plurality of image data, thereby venerating merged image data with an enhanced dynamic range.

The camera module group 1100 may include the image sensing apparatus 200 of FIG. 1.

For example, the ISP 100 of FIG. 1 may be implemented inside the camera module group 1100 of FIG. 12, in the image processor 1210 of FIG. 11, or in the image generator 1214 of FIG. 11. As another example, each of the sub-image processors 1212a, 1212b, 1212c may include an ISP 100.

The camera module controller 1216 may provide control signals to the camera modules 1100a, 1100b, and 1100c. The control signal's provided by the camera module controller 1216 may be provided to the camera modules 1100a, 1100b, and 1100c via the control signal lines CSLa, CSLb, and CSLc, which are separate from one another.

One of the camera modules 1100a, 1100b, and 1100c, for example, the camera module 1100b, may be designated as a master camera in accordance with the mode signal "Mode Signal" or the image generating information "Generating Information", which includes a zoom signal, and the other camera modules, the camera modules 1100a and 1100c, may be designated as slave cameras. This type of information may be included in a control signal and may be provided to the camera modules 1100a, 1100b, and 1100c via the control signal lines CSLa, CSLb, and CSLc, which are separate from one another.

Master and slave camera modules may be changed in accordance with a zoom factor or the mode signal "Mode Signal". For example, if the camera module 1100a has a wider field of view, but a zoom ratio with a smaller zoom factor, than the camera module 1100b, the camera module 1100b may operate as a master, and the camera module 1100a may operate as a slave. In addition, if the camera module 1100a has a zoom ratio with a zoom factor greater than that of the camera module 1100b, the camera module 1100a may operate as a master, and the camera module 1100b may operate as a slave.

In an exemplary embodiment of the present inventive concept, the control signals provided from the camera module controller 1216 to the camera modules 1100a, 1100b, and 1100c may include a sync enable signal. For example, if the camera module 1100b is a master camera and the camera modules 1100a and 1100c are slave cameras, the camera module controller 1216 may transmit the sync enable signal to the camera module 1100b. The camera module 1100b may receive the sync enable signal, and may generate a sync signal based on the sync enable signal. In addition, the camera module 1100b may provide the sync signal to the camera modules 1100a and 1100c via sync signal lines SSL. The camera modules 1100a, 1100b and 1100c may transmit image data to the application processor 1200 in synchronization with the sync signal.

In an exemplary embodiment of the present inventive concept, the control signals provided from the camera module controller 1216 to the camera modules 1100a, 1100b, and 1100c may include mode information corresponding to the mode signal "Mode Signal" provided to the camera modules 1100a, 1100b, and 1100c. The camera modules 1100a, 1100b, and 1100c may operate in one of first and second operating modes, which are associated with the speed of sensing an image of an object, in accordance with the mode information.

In the first operating mode, the camera modules 1100a, 1100b, and 1100c may generate an image signal at a first speed (e.g., generate an image signal of a first frame rate), may encode the image signal at a second speed, which is higher than the first speed (e.g. encode the image signal at a second flame rate, which is higher than the first frame rate), and may transmit the encoded image signal to the application processor 1200. Here, the second speed may be less than 30 times the first speed.

The application processor 1200 may store a received image signal, e.g., an encoded image signal, in the internal memory 1230 or in the external memory 1400. In addition, the application processor 1200 may read and decode the encoded image signal from the internal memory 1230 or the external memory 1400, and may display image data venerated based on the decoded image signal. For example, the decoding of the encoded image signal may be performed by the sub-processors 1212a, 1212b, and 1212c of the image processor 1210, and image processing mays be performed on the decoded image signal.

In the second operating mode, the camera modules 1100a, 1100b, and 1100c may generate an image signal at a third speed, which is lower than the first speed (e.g., generate an image signal of a third frame rate, which is lower than the first frame rate) and may transmit the image signal to the application processor 1200. The image signal transmitted to the application processor 1200 may be a non-encoded signal. The application processor 1200 may perform image processing on the image signal received from the camera modules 1100a, 1100b, and 1100c or may store the received image signal in the internal memory 1230 or the external memory 1400.

The PMIC 1300 may supply power, for example, a power supply voltage, to the camera modules 1100a, 1100b, and 1100c. For example, the PMIC 1300 may supply a first power to the camera module 1100a via a power signal line PSLa, a second power to the camera module 1100b via a power signal line PSLb, and a third power to the camera module 1100c via a power signal line PSLc, under the control of the application processor 1200.

The PMIC 1300 may generate power corresponding to each of the camera modules 1100a, 1100b, and 1100c and control the level of the power in response to a power control signal PCON provided from the application processor 1200. The power control signal PCON may include power control signals for different operating modes of the camera modules 1100a, 1100b, and 1100c. For example, the operating modes of the camera modules 1100a, 1100b, and 1100c may include a low power mode, in which case, the power control signal PCON may include information indicating which camera module is to operate in the low power mode and information indicating the level of power to be set. The level of power provided may be the same for all the camera modules 1100a, 1100b, and 1100c or may differ from one camera module to another camera module. In addition, the level of power provided to the camera modules 1100a, 1100b, and 1100c may be dynamically changed.

Accordingly, exemplary embodiments of the present inventive concept provide an image sensing device capable of reducing fixed pattern noise.

In addition, exemplary embodiments of the present inventive concept provide an image sensing device capable of maintaining a signal to noise ratio (SNR) and an image quality by performing adaptive tuning depending on the characteristics of fixed pattern noise.

While the present inventive concept has been described with reference to exemplary embodiments thereof, it will be understood by those of ordinary skill in the art that various changes in form and details may be made thereto without departing from the spirit and scope of the present inventive concept.

What is claimed is:

1. An image signal processing method comprising:
   detecting a high frequency component in an input image received from an image sensor;
   calculating a ratio of the detected high frequency component;
   reconstructing a high frequency image based on the calculated ratio; and
   outputting an output image by combining the reconstructed high frequency image with a non-high frequency image of the input image.

2. The image signal processing method of claim 1, wherein when the calculated ratio is within a predetermined range, the ratio is applied to a binning image.

3. The image signal processing method of claim 2, wherein the predetermined range is based on a lowest ratio and a highest ratio set by a user.

4. The image signal processing method of claim 1, wherein when the calculated ratio is not within a predetermined range, the ratio is adjusted and applied to a binning image.

5. The image signal processing method of claim 1, wherein a binning image is generated by binning the input image.

6. The image signal processing method of claim 5, wherein the calculating of the ratio of the detected high frequency component comprises calculating a ratio of the detected high frequency component in the binning image.

7. The image signal processing method of claim 5, wherein the reconstructing of the high frequency image based on the calculated ratio comprises generating a modified high frequency image by applying the ratio to the binning image.

8. The image signal processing method of claim 1, wherein the non-high frequency image is an image of remaining frequency components, not including the high frequency component, in the input image.

9. An image sensing device comprising:
   an image sensor configured to generate an input image; and
   an image signal processor configured to reconstruct a high frequency image from the input image and configured to generate an output image,
   wherein the output image is an image generated by combining the reconstructed high frequency image with a non-high frequency image of the input image.

10. The image sensing device of claim 9, wherein the image signal processor is configured to detect a high frequency component in the input image.

11. The image sensing device of claim 10, wherein the image signal processor is configured to calculate a ratio of the detected high frequency component to a binning image of the input image.

12. The image sensing device of claim 11, wherein the image signal processor is configured to reconstruct the high frequency image by applying the ratio to the binning image.

13. The image sensing device of claim 12, wherein the predetermined range is based on a predetermined lowest ratio and a predetermined highest ratio.

14. The image sensing device of claim 11, wherein the image signal processor is configured to reconstruct the high frequency image by adjusting the ratio when the calculated ratio is not within a predetermined range.

15. An image signal processor comprising:
- a high frequency (HF) component detector configured to detect a high frequency component and a non-high frequency component in an input image;
- an HF ratio calculator configured to calculate a ratio of the high frequency component to a binning image; and
- an HF image reconstructor configured to reconstruct a high frequency image based on the ratio, and to output an output image by combining the reconstructed high frequency image with a non-high frequency image of the input image.

16. The image signal processor of claim 15, further comprising a threshold level setting unit configured to adjust the ratio within a set predetermined range.

17. The image signal processor of claim 16, wherein the reconstructed high frequency image is generated based on the adjusted ratio.

18. The image signal processor of claim 16, wherein the HF image reconstructor reconstructs the high frequency image at a preset lowest threshold ratio when the ratio is smaller than the predetermined range, and reconstructs the high frequency image at a preset highest threshold ratio when the ratio is greater than the predetermined range.

19. The image signal processor of claim 15, further comprising a binning unit configured to generate the binning image by binning the input image, and to output the binning image to the HF ratio calculator and the HF image reconstructor.

20. The image signal processor of claim 19, wherein the HF image reconstructor is configured to reconstruct the high frequency image by applying the ratio to the binning image.

* * * * *